United States Patent
Weaver

(10) Patent No.: US 7,448,640 B2
(45) Date of Patent: Nov. 11, 2008

(54) PIN-ENGAGING DRAWBAR AND LOCK PLATE WEDGES

(76) Inventor: Danny C. Weaver, P.O. Box 107, Keithville, LA (US) 71047

( * ) Notice: Subject to any disclaimer, the term of this patent is extended or adjusted under 35 U.S.C. 154(b) by 209 days.

(21) Appl. No.: 11/374,626

(22) Filed: Mar. 13, 2006

(65) Prior Publication Data

US 2006/0208456 A1    Sep. 21, 2006

Related U.S. Application Data

(60) Provisional application No. 60/661,386, filed on Mar. 15, 2005.

(51) Int. Cl.
    *B60D 1/28*    (2006.01)
(52) U.S. Cl. .................. 280/507; 280/511; 403/379.3
(58) Field of Classification Search ............... 280/506, 280/507, 511, 491.5; 403/370, 374.3, 379.3, 403/379.4, 379.2; 224/519, 520, 521
    See application file for complete search history.

(56) References Cited

U.S. PATENT DOCUMENTS

| 5,244,133 A | 9/1993 | Abbott et al. ......... 224/42.03 B |
| 5,333,888 A | 8/1994 | Ball ........................... 280/504 |
| 5,344,175 A | 9/1994 | Speer ......................... 280/506 |
| 5,423,566 A | 6/1995 | Warrington et al. ...... 280/415.1 |
| 5,547,116 A * | 8/1996 | Eckhart ..................... 224/509 |
| 6,688,804 B1 | 2/2004 | Parent ..................... 403/379.3 |
| 6,835,021 B1 | 12/2004 | McMillan ................ 403/374.4 |
| 6,974,147 B1 * | 12/2005 | Kolda ........................ 280/506 |
| 2006/0208456 A1 * | 9/2006 | Weaver .................... 280/491.5 |

* cited by examiner

*Primary Examiner*—Anne Marie Boehler
(74) *Attorney, Agent, or Firm*—John M. Harrison

(57) ABSTRACT

A pin-engaging drawbar wedge and lock plate wedge are designed to mount in the drawbar of a trailer hitch or alternative trailer and accessory hitch or receiver assembly. The pin-engaging drawbar wedge includes a bolt extending into the drawbar and in one embodiment, having the bolt head secured to a wedge positioned beneath the locking pin extending transversely through the receiver and the drawbar. Alternatively, the bolt threads into a nut secured to the wedge. The wedge bevel face or surface engages the locking pin and the locking pin openings are typically elliptical or elongated in the drawbar, to facilitate rotating the bolt or nut and forcing the wedge against the locking pin, thus tightening the drawbar against the hitch receiver. In another embodiment the bolt extends through the drawbar and a slotted guide plate to a lock plate and rotating the nut forces the lock plate against the locking pin and the guide plate and tightens the drawbar against the hitch receiver. The locking action in both embodiments eliminates both vertical and horizontal slack or play between the drawbar and the hitch receiver.

4 Claims, 4 Drawing Sheets

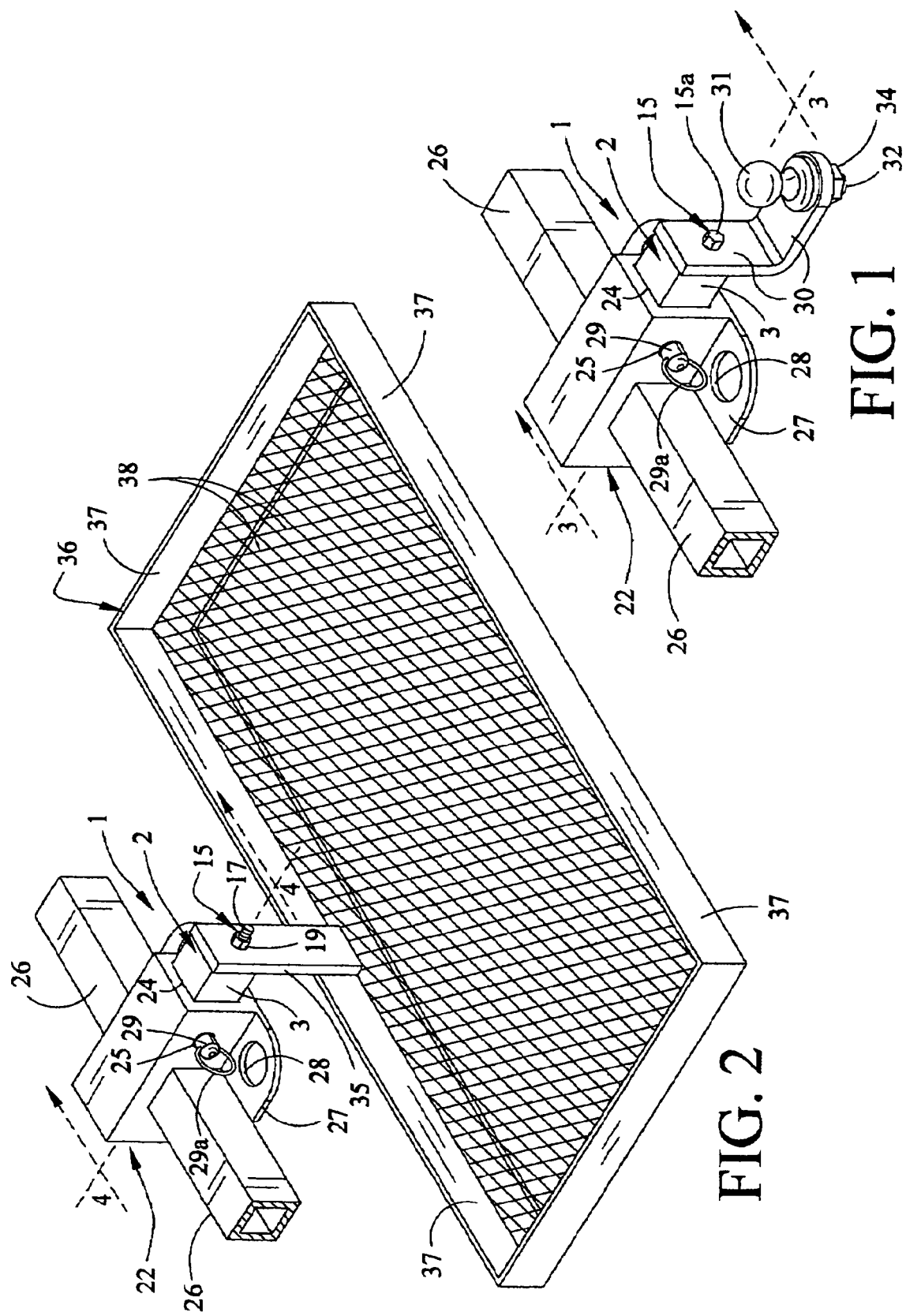

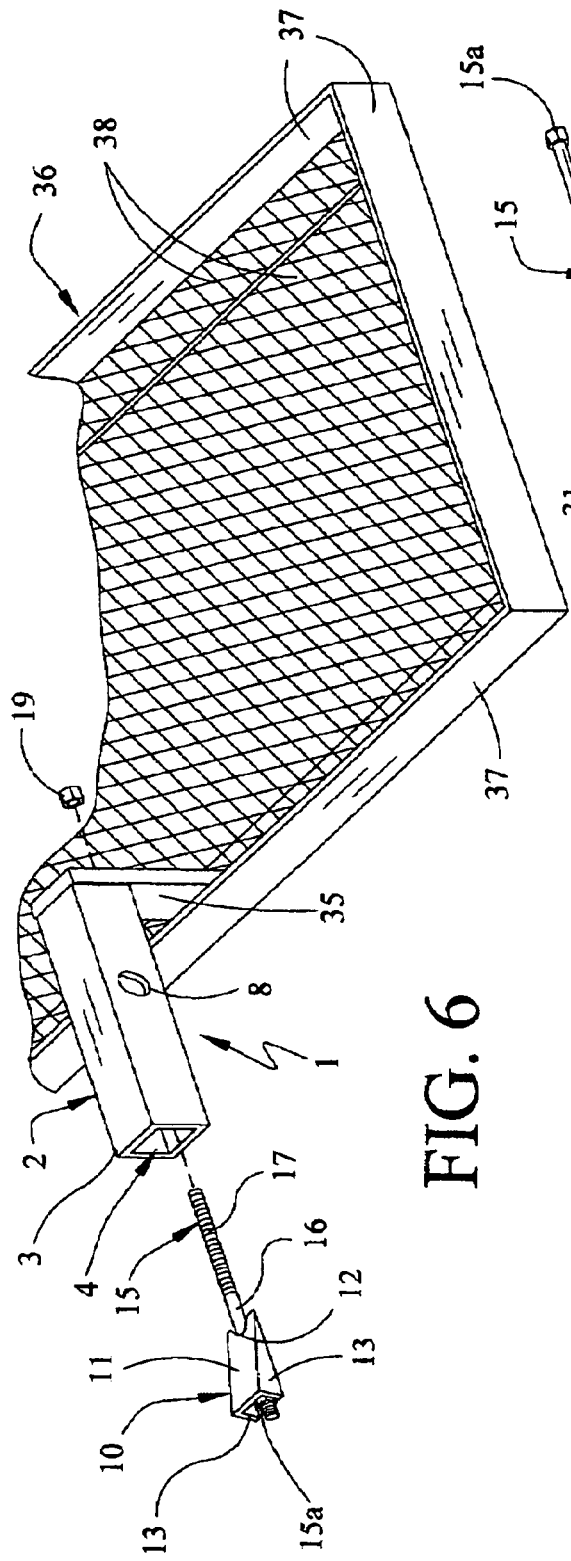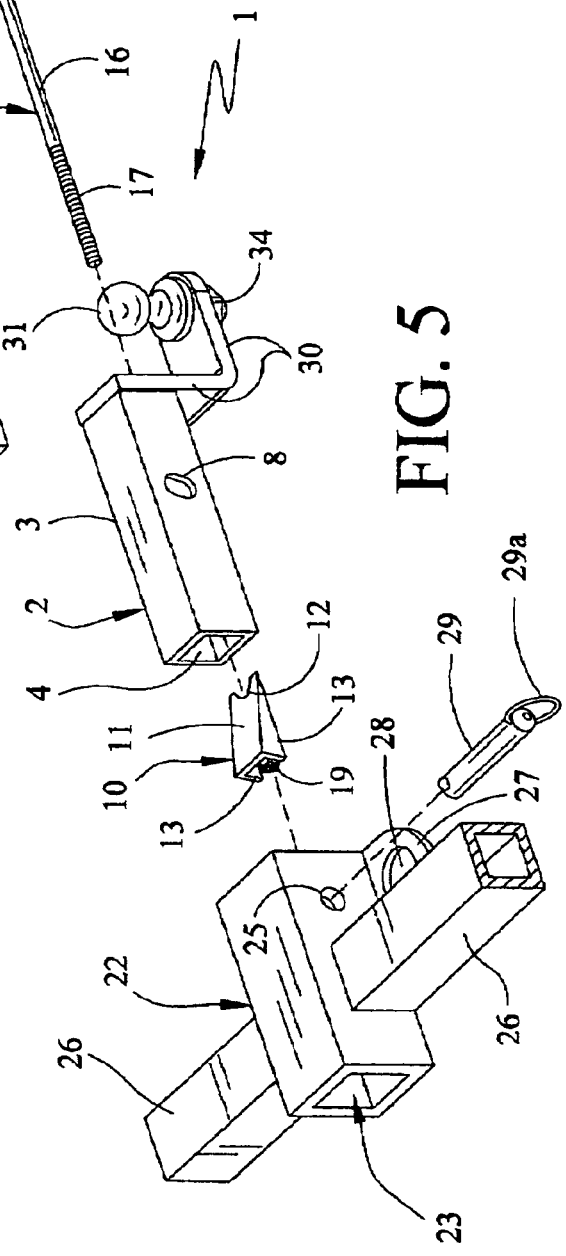
FIG. 6
FIG. 5

PIN-ENGAGING DRAWBAR AND LOCK PLATE WEDGES

CROSS-REFERENCE TO RELATED APPLICATIONS

This application claims the benefit of and incorporates by reference Provisional Application Ser. No. 60/661,386, Filed Mar. 15, 2005.

BACKGROUND OF THE INVENTION

Field of the Invention

This invention relates to trailer hitches, receptacles and receivers for vehicles and more particularly, to a pin-engaging drawbar wedge and a pin-engaging lock plate wedge which are each designed to selectively tighten a drawbar inside a receiver to prevent vibration in both the horizontal and vertical axis while towing a trailer or carrying an accessory. One of the problems involved in towing trailers and carrying accessory equipment using conventional drawbars inserted in receiver receptacles or sleeves is the tolerance, slack or play between the drawbar frame and the inside surfaces of the hitch receiver, which results in vibration and wear, both horizontally and vertically, during the towing or carrying operation.

The pin-engaging drawbar wedge of this invention includes a sliding wedge fitted inside a drawbar and attached to a bolt extending through the front of the drawbar. The wedge orientation is such that rotation of the bolt or a nut on the bolt, depending upon the bolt orientation, draws the bevelled surface of the wedge against a locking pin extended transversely through opposed, elongated or elliptically-shaped openings in the drawbar and opposed registering round openings in the receiver, to removably lock and immobilize the drawbar inside the hitch receiver and eliminate horizontal and vertical vibration.

The pin-engaging lock plate wedge serves the same purpose and uses a shaped lock plate which engages the transverse locking pin in the drawbar to force the locking pin against the hitch receiver as it extends transversely through the opposed round hitch receiver openings and the corresponding registering, elliptically-shaped openings in the drawbar. A bolt is welded or otherwise fixed to the lock plate and extends through a slot in a companion guide plate lying adjacent to the lock plate for guiding the lock plate upwardly into a locked configuration responsive to tension applied to the bolt by tightening a nut on the threaded end of the bolt extending from the drawbar. Alternatively, the nut can be fixed to the lock plate and the bolt head located outside the drawbar for tightening against the drawbar.

SUMMARY OF THE INVENTION

The pin-engaging drawbar wedge of this invention is characterized by a wedge slidably engaging the bottom inside surface of a drawbar, with the bevelled upper surface facing the front or connecting end of the drawbar. In a first aspect of this embodiment the wedge is welded or otherwise attached to a bolt extending to the front of the drawbar, such that rotation of a nut threaded on the bolt causes the wedge to selectively advance or recede linearly along the bottom surface of the drawbar. The bevelled upper surface is designed to engage a pin or bolt transversely extended through elongated, opposed openings located in the drawbar and conventional registering round openings in the hitch receptacle or receiver. Accordingly, rotation of the nut threaded on the bolt causes the wedge to advance forwardly in the drawbar and the bevelled surface of the wedge engages the locking pin and forces the drawbar downwardly due to the play in the elongated drawbar openings. This action jams, locks or wedges the drawbar against the hitch receiver. The locked drawbar configuration effectively prevents the drawbar from vibrating either in the horizontal or vertical plane inside the hitch receiver. In an alternative aspect of this embodiment of the invention the nut is welded or otherwise attached to the wedge and the bolt is extended through the front or connecting end of the drawbar and threaded into the fixed nut. Rotation of the bolt thus also effects sliding movement of the wedge inside the drawbar as described above.

In a second embodiment of the invention a lock plate is shaped to define a cradle bend for engaging the transverse mount pin and lies adjacent to a slotted guide plate having a toe bar along the bottom edge thereof. The lock plate is typically fixed to the head or shank end of a bolt, which extends through a slot in the companion guide plate. A tab extends from the guide plate through an opening in the top of the drawbar and the toe bar provided on the bottom edge of the guide plate engages the lock plate. Rotation of the nut on the threaded end of the bolt extending through the end of the drawbar adjusts the position of the lock plate against the mount pin in the opposed, elongated mount pin openings. Accordingly, in both embodiments, it will be appreciated that the threads of the bolt may be extended through an opening in the front or connecting end of the drawbar or other mount plate member mounted thereon and the opposite end or head of the bolt welded to the wedge, or lock plate, such that the nut may be rotated on the bolt and the wedge or lock plate moved forwardly or rearwardly inside the drawbar, depending upon the direction of rotation of the nut. Alternatively, in both embodiments of the invention, the bolt is reversed in the drawbar and the nut is welded to the wedge or lock plate and receives the bolt threads, with the head end of the bolt extending through a front opening in the drawbar or through a mount plate or member welded or otherwise attached to the drawbar. In both cases, the wedge or lock plate is caused to move forwardly and rearwardly in the drawbar to tighten and loosen the mount pin by selective rotation of the nut or the bolt.

BRIEF DESCRIPTION OF THE DRAWINGS

The invention will be better understood by reference to the accompanying drawings, wherein:

FIG. 1 is a perspective view of a first preferred embodiment of the pin-engaging drawbar wedge embodiment of this invention, wherein the drawbar element receives a hitch ball and bracket combination for attachment to a receiver and trailer hitch;

FIG. 2 is a perspective view of an alternative accessory mount using the pin-engaging drawbar wedge illustrated in FIG. 1, more particularly illustrating an accessory support platform fitted with a mount bracket attached to the drawbar of this invention for removably supporting the platform from a hitch receiver and trailer hitch;

FIG. 5 is an exploded view of the pin-engaging drawbar wedge illustrated in FIGS. 1 and 3, more particularly illustrating a preferred positioning of the wedge, the driving bolt illustrated in FIG. 3 and the drawbar with respect to the hitch receiver;

FIG. 6 is an exploded view of the pin-engaging drawbar wedge illustrated in FIG. 2, more particularly illustrating a typical positioning of the wedge fitted with the driving bolt illustrated in FIG. 3 welded thereto, inside the drawbar prior to insertion of the pin or bolt.

DESCRIPTION OF THE PREFERRED EMBODIMENTS

Figure 3:
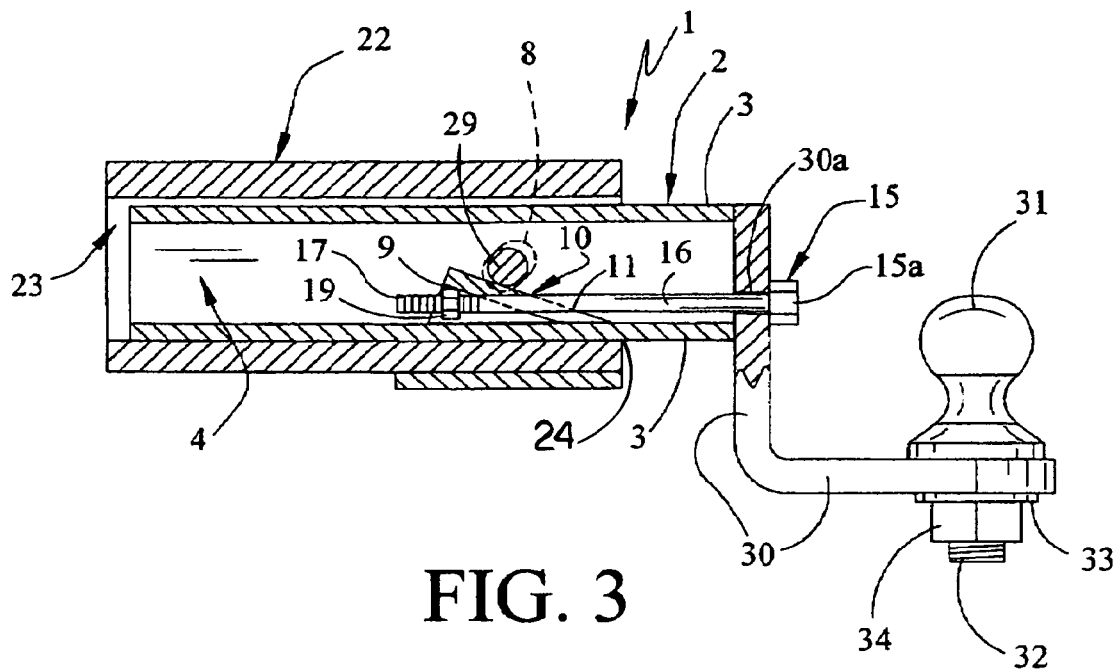
FIG. 3 is a sectional view taken along line 3-3 of the pin-engaging drawbar wedge and receiver hitch assembly illustrated in FIG. 1, more particularly illustrating a typical positioning of the internal wedge and driving bolt, with the bevelled wedge surface engaging a locking pin or bolt extending through angled, elongated, transversely-opposed openings in the drawbar and registering conventional, round openings in the hitch receiver.
Figure 4:
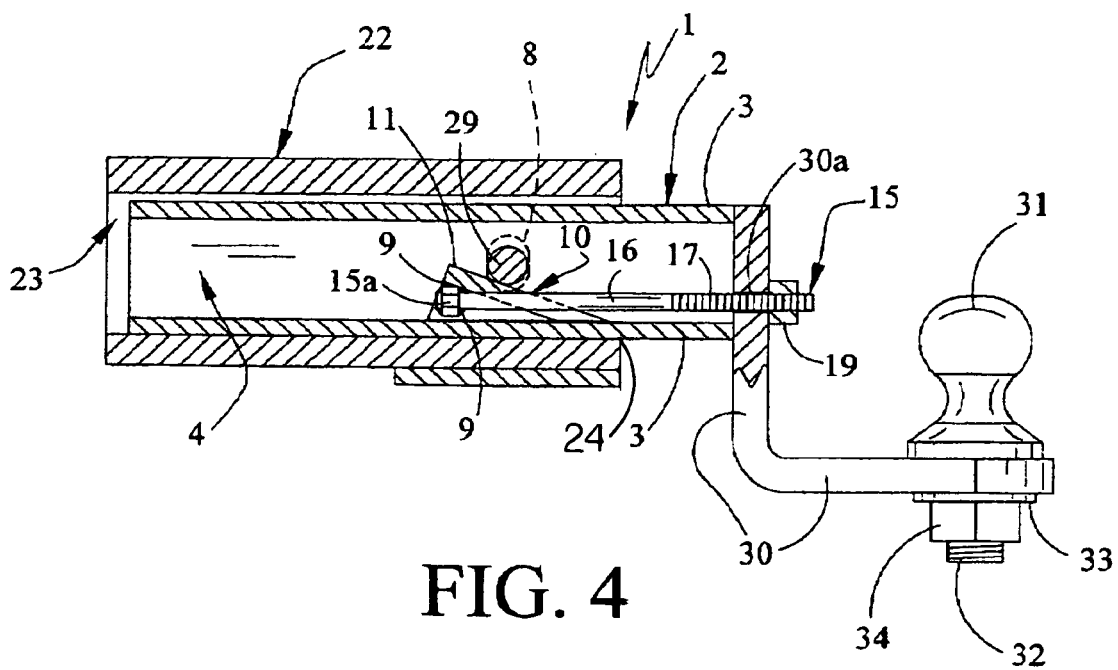
FIG. 4 is a sectional view taken along line 4-4 of the pin-engaging drawbar wedge illustrated in FIG. 2, more particularly illustrating horizontally-oriented, elongated, transversely-opposed locking pin or bolt openings, with a locking pin or bolt in place and engaging the sliding wedge inside the drawbar and with the drawbar mount pin opening vertically oriented in the drawbar and the driving bolt reversed from the position illustrated in FIG. 3.

Referring initially to FIGS. 1, 3, 4 and 5 of the drawings, a first embodiment pin-engaging drawbar wedge of this invention is generally illustrated by reference numeral 1. The pin-engaging drawbar wedge 1 is characterized by a drawbar 2 which has a drawbar frame 3, typically constructed of square tubing of suitable length and wall thickness and having a frame interior 4. The drawbar 2 is further provided with opposed, elongated or elliptical drawbar mount pin openings 8, which are transversely provided in the drawbar 2 and are typically oriented in angular relationship with respect to the vertical and the horizontal, as illustrated in FIG. 3. Alternatively, the drawbar pin mount openings 8 may be vertically oriented as illustrated in FIG. 4 and in both cases, a mount pin 29 is extended through the drawbar pin openings 8 and through a pair of corresponding, typically round, registering mount pin openings 25, provided in the trailer and accessory hitch or receiver 22, as illustrated in FIG. 1 of the drawing. Accordingly, the drawbar 2 is removably tightened or locked inside the hitch interior 23 of the trailer and accessory hitch or receiver 22 when inserted in the hitch receptacle 24 and as the mount pin 29 is extended through the registering hitch mount pin openings 25 and drawbar mount pin openings 8, respectively, as illustrated in FIGS. 3 and 4. The trailer and accessory hitch or receiver 22 is typically welded, bolted or otherwise attached to a trailer hitch mount 26 of desired configuration which is designed to fit on a towing vehicle (not illustrated) for towing a trailer (not illustrated) or mounting accessory equipment, as hereinafter further described. A chain bracket 27 and hook opening 28 therein are typically provided on each side of the trailer and accessory hitch or receiver 22 and/or the trailer hitch mount 26 (FIG. 1). A mount pin ring 29a is typically provided in one end of the mount pin 29 for ease in manipulation of the mount pin 29 during the insertion and withdrawal procedures.

As further illustrated in FIGS. 1, 3, 4 and 5 of the drawings, an L-shaped ball mount 30 is typically provided and has a horizontal leg designed to receive a trailer ball 31, wherein a threaded post 32, extending downwardly from the trailer ball 31, projects through an opening (not illustrated) in the horizontal leg of the ball mount 30 and is typically secured in place by means of a ball lock washer 33 and a ball nut 34 (FIGS. 3 and 4). The vertical leg of the ball mount 30 is typically welded to the front or connecting end of the drawbar 2. Accordingly, the hitch coupler (not illustrated) of a trailer can be secured on the trailer ball 31 in conventional fashion and towed by a vehicle when the drawbar 2 is fitted in the hitch receptacle 24 and inside the hitch interior 23 of the trailer and accessory hitch or receiver 22 and the mount pin 29 is extended transversely through the registering elongated drawbar mount pin openings 8 and round hitch mount pin openings 25, as further illustrated in FIGS. 1, 3 and 4.

Referring now to FIGS. 3-5 of the drawings, a wedge 10 is seated inside the drawbar 2 and positioned with a flat surface thereof located on the flat bottom leg of the drawbar 2 as illustrated. The wedge 10 is characterized by a wedge bevel 11 that extends along parallel wedge legs 13 (FIG. 5) beneath the mount pin 29, which projects transversely through the round hitch mount pin openings 25 and the registering elongated or elliptical drawbar mount pin openings 8. The wedge 10 typically includes a frontal wedge notch 12 at the bottom end of the wedge bevel 11, as illustrated in FIG. 5, for accommodating the threaded end of a draw bolt 15, having a draw bolt head 15a projecting outwardly of a draw bolt opening 30a provided in the upper leg of the ball mount 30, as further illustrated in FIGS. 3 and 5 of the drawings. Accordingly, the draw bolt shank 16 of the draw bolt 15 projects rearwardly through the draw bolt opening 30a, toward the wedge 10 and the draw bolt threads 17 extend through the wedge notch 12 and thread into a draw bolt nut 19, which is typically welded inside the wedge 10 between the wedge legs 13, at the weld 9, as further illustrated in FIGS. 3 and 5 of the drawings.

In an alternative aspect of this embodiment of the invention, the draw bolt 15 is reversed from the position illustrated in FIG. 3 and the draw bolt head 15a is welded to the wedge 10, typically at a weld 9, while the draw bolt shank 16 and draw bolt threads 17 project forwardly through the wedge notch 12 and the draw bolt opening 30a in the ball mount 30, to receive a draw bolt nut 19 (FIG. 4). Accordingly, in both embodiments, rotation of the draw bolt nut 19 on the draw bolt threads 17 or the draw bolt head 15a causes the wedge 10 to move forwardly or rearwardly and thus selectively engage and disengage the mount pin 29 inside the drawbar 2.

In another accessory mount aspect of the invention, the drawbar 2 is connected to a basket mount bracket 35, which is welded, bolted or otherwise secured to a basket 36 (FIGS. 2 and 6). The basket 36 is typically characterized by a basket frame 37 of selected shape, dimensions and size and having a bottom and sides typically constructed of expanded metal 38, as further illustrated in FIGS. 2 and 6 of the drawings. Accordingly, the wedge 10 and connected draw bolt 15 are inserted in the frame interior 4 of the drawbar 2 as illustrated in FIG. 6 of the drawings and are typically stabilized in place by the basket mount bracket 35, as further illustrated in FIGS. 3 and 4 of the drawings.

In operation, and referring initially to FIGS. 1, 3 and 5 of the drawings, under circumstances where the trailer ball 31 is secured to the horizontal leg of a generally L-shaped ball mount 30 in conventional fashion, the vertical leg of the ball mount 30 is typically welded to one end of the drawbar frame 3 of a drawbar 2. A pair of oppositely-disposed drawbar mount pin openings 8 are provided transversely through the drawbar frame 3 and are slightly elongated or elliptically-shaped in angular relationship with respect to the vertical and horizontal axis of the drawbar frame 3. A pair of opposed round hitch mount pin openings 25 are provided in the conventional trailer and accessory hitch or receiver 22 for transversely receiving a mount pin 29 when the round hitch mount pin openings 25 (FIG. 1) and the elongated drawbar mount pin openings 8 are aligned as the drawbar 2 is inserted through the hitch receptacle 24 and inside the hitch interior 23 of the trailer and accessory hitch or receiver 22. As further illustrated in FIG. 3 of the drawings, the draw bolt 15 is inserted through the draw bolt opening 30a in the ball mount 30 and the draw bolt threads 17 thereof extended through a corresponding draw bolt nut 19, which is typically welded by means of weld 9 to the wedge 10, slidably disposed on the flat bottom leg of the drawbar frame 3. The wedge 10 is so positioned inside the frame interior 4 of the drawbar 2 that the wedge bevel 11 contacts the transversely-oriented mount pin 29 and causes the drawbar 2 to rise and fall inside the trailer and accessory hitch or receiver 22, due to the action of the stationary mount pin 29 in the elliptical or elongated drawbar mount pin openings 8 and the aligned or registering, round hitch mount pin openings 25, responsive to movement of the wedge 10 forwardly or rearwardly inside the frame interior 4 of the drawbar frame 3. Accordingly, rotation of the draw bolt 15 by placing a wrench or other tool on the draw bolt head 15a effects this sliding movement of the wedge 10 inside the frame interior 4 to tighten the wedge 10 against the mount pin 29 or loosen it therefrom, as desired. Under circumstances where it is desired to wedge or tighten the drawbar 2 inside the trailer and accessory hitch or receiver 22, the wrench or other tool is placed on the draw bolt head 15a and is rotated in the clockwise direction facing the draw bolt head 15a. This maneuver causes the draw bolt threads 17 to rotate inside the fixed draw bolt nut 19 and pull the wedge 10 forwardly, thus engaging the wedge bevel 11 with the mount pin 29 and lowering the drawbar 2 in the trailer and accessory hitch 24. Additional movement of the wedge 10 forwardly forces the drawbar 2 farther downwardly due to the "play" in the elongated drawbar mount pin openings 8, such that the elongated drawbar mount pin openings 8 ride on the fixed mount pin 29, thus displacing, jamming or wedging the drawbar 2 tightly inside the hitch interior 23 of the trailer and accessory hitch or receiver 22. This position of the wedge 10 against the mount pin 29 and the drawbar 2 against the trailer and accessory hitch 24 prevents both lateral or horizontal and vertical movement of the drawbar 2 with respect to the trailer and accessory hitch 22, effectively eliminating vibration and "play" which is detrimental during the towing or carrying operation. Release of the wedge 10 from contact with the mount pin 29 is effected by reversing rotation of the draw bolt 15, thus forcing the wedge 10 rearwardly as the draw bolt threads 17 rotate in reverse fashion inside the fixed draw bolt nut 19 to facilitate upward movement of the drawbar 2, loosening of the mount pin 29 and removal of the mount pin 29 from the aligned drawbar mount pin openings 8 and corresponding round hitch mount pin openings 25.

Operation of the pin-engaging drawbar wedge 1 of this invention illustrated in FIG. 4 is effected in the same manner as that described above by clockwise or counterclockwise rotation of the drawbar nut 19, to selectively pull the draw bolt 15 and the wedge 10 forwardly or facilitate reverse movement of the wedge 10 in the matter illustrated above with respect to FIG. 3 of the drawings.

Figure 7:
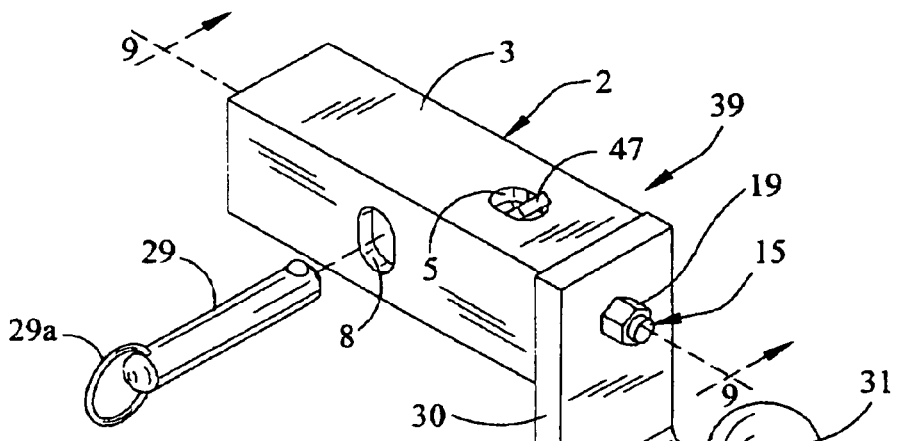
FIG. 7 is a perspective view of an alternative pin-engaging lock plate wedge embodiment of the invention.
Figure 8:
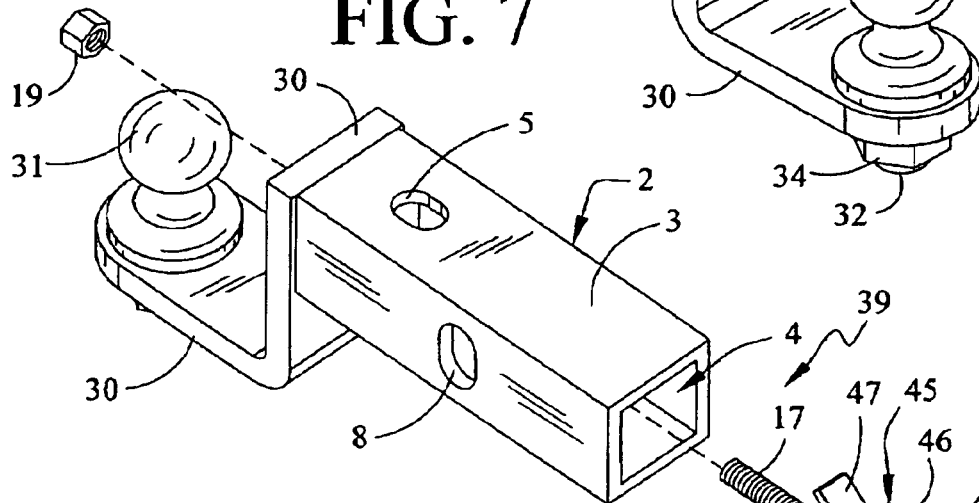
FIG. 8 is a reverse perspective view of the pin-engaging lock plate wedge illustrated in FIG. 7, illustrating typical draw bolt, guide plate and lock plate elements.
Figure 9:
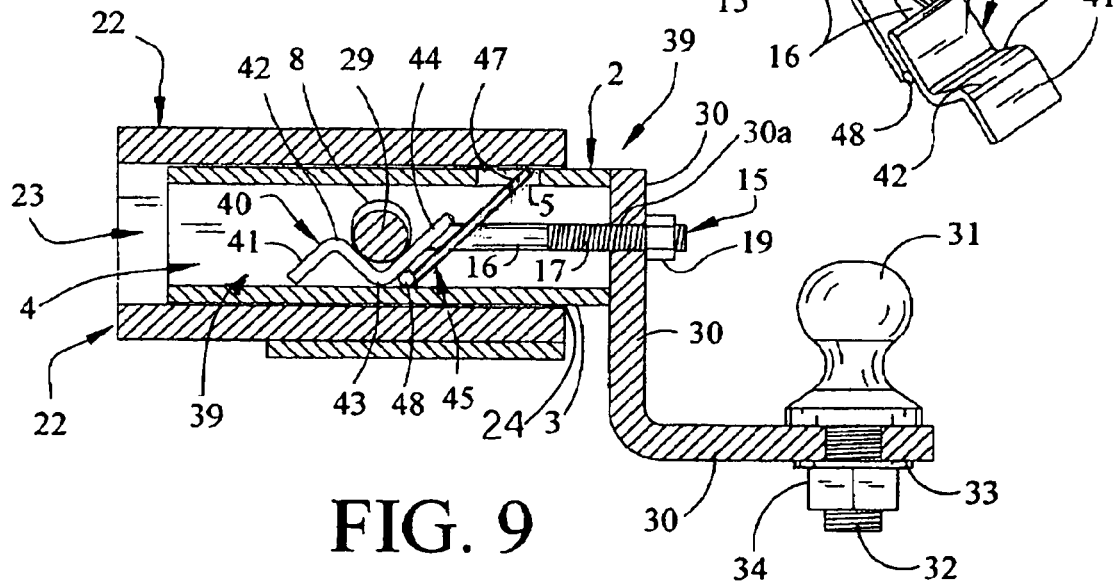
FIG. 9 is a sectional view of the pin-engaging lock plate wedge, taken along line 9-9 in FIG. 7.

In the second embodiment of the invention, referring to FIGS. 7-9 of the drawings, the pin-engaging lock plate wedge is illustrated by reference numeral 39. The pin-engaging elements of the pin-engaging lock plate wedge 39 are seated inside the frame interior 4 of the drawbar frame 3 of a drawbar 2 and include a chair-shaped lock plate 40 characterized by a lock plate leg 41, having a plate leg bend 42. The lock plate leg 41 extends from the plate leg bend 42 to define a cradle bend 43 that engages the transversely-oriented mount pin 29 described above with respect to FIGS. 1-6, as illustrated in FIG. 9. A lock plate engaging leg 44 extends from the cradle bend 43 and typically fixedly receives the head or shank end of a draw bolt 15, as further illustrated in FIG. 9. The draw bolt shank 16 of the draw bolt 15 extends from the bolt head or shank end through the guide plate slot 46 of a guide plate 45, as illustrated in FIG. 8. A guide plate tab 47 projects from the top of the guide plate 45 and extends through a top frame opening 5 provided in the drawbar frame 3 of the drawbar 2 (FIGS. 7 and 9). A toe bar 48 is welded or otherwise fixed to the bottom edge of the guide plate 45 and serves to space the bottom edge thereof from the lock plate engaging leg 44 of the lock plate 40, as further illustrated in FIG. 9.

Accordingly, it will be appreciated that when the drawbar 2 is inserted in the hitch receptacle 24 and hitch interior 23 of the trailer and accessory hitch or receiver 22 as illustrated in FIGS. 1 and 9, the drawbar 2 is secured in place by the transverse mount pin 29. The mount pin 29 is inserted through a pair of opposed, round hitch mount pin openings 25 provided in the conventional trailer and accessory hitch or receiver 22. The round hitch mount pin openings 25 receive the mount pin 29 when the round hitch mount pin openings 25 and the corresponding opposed, elongated drawbar mount pin openings 8 are aligned as the drawbar 2 is inserted in the hitch receptacle 24 and inside the hitch interior 23 of the trailer and accessory hitch or receiver 22.

As further illustrated in FIG. 9 of the drawings, the draw bolt 15 is inserted from the frame interior 4 of the drawbar 2, through the draw bolt opening 30a in the upper leg of the ball mount 30. A typically welded attachment is made between the draw bolt shank 16 and the lock plate engaging leg 44, and the extending draw bolt threads 17 thereof receive a corresponding draw bolt nut 19 at the ball mount 30. The lock plate 40 is so positioned inside the frame interior 4 of the drawbar 2 that the cradle bend 43 receives the mount pin 29 and causes the drawbar 2 to rise and fall inside the trailer and accessory hitch or receiver 22, due to the action of the mount pin 29 in the elliptical or elongated drawbar mount pin openings 8 and the aligned round hitch mount pin openings 25 (FIG. 5), responsive to movement of the lock plate 40 forwardly or rearwardly inside the frame interior 4 of the drawbar frame 3. Accordingly, forward linear movement of the draw bolt 15 by placing a wrench or other tool on the draw bolt nut 19 effects this sliding movement of the lock plate 40 inside the frame interior 4, causing the lock plate 40 to approach the guide plate 45 and tightly engaging the toe bar 48 and tighten the lock plate 40 against the mount pin 29, as described above with respect to FIGS. 1-6 of the drawings.

In application, under circumstances where it is desired to wedge or tighten the drawbar 2 inside the trailer and accessory hitch 22, a wrench or other tool is placed on the draw bolt nut 19 and is rotated in the clockwise direction facing the draw bolt nut 19. The maneuver pulls the lock plate engaging leg 44 and the lock plate 40 forwardly toward the guide plate 45 and against the toe bar 48, which guide plate 45 remains in place due to projection of the guide plate tab 47 through the top frame opening 5 in the drawbar 2 and against the front wall of the top frame opening 5. The mount pin 29 then rises on the lock plate 40, thus lowering the drawbar 2 in the trailer and accessory hitch or receiver 24. Upward movement of the mount pin 29 is enabled by angular contact of the lock plate engaging leg 44 with the toe bar 48 (FIG. 9). Additional movement of the lock plate 40 forwardly forces the drawbar 2 farther downwardly due to the "play" in the elongated drawbar mount pin openings 8, such that the elongated drawbar mount pin openings 8 ride on the fixed mount pin 29, thus displacing, jamming or wedging the drawbar 2 tightly inside the hitch interior 23 of the trailer and accessory hitch or receiver 22. This position of the lock plate 40 against the toe bar 48 and the mount pin 29, and the drawbar 2 against the trailer and accessory hitch or receiver 24, prevents both lateral or horizontal and vertical movement of the drawbar 2 with respect to the trailer and accessory hitch 22, effectively eliminating vibration and "play" which is detrimental during the towing or carrying operation. Release of the lock plate 40 from contact with the mount pin 29 is effected by reversing rotation of the draw bolt nut 19 on the draw bolt 15, thus forcing the lock plate 40 rearwardly to facilitate upward movement of the drawbar 2 and allowing removal of the mount pin 29 from the aligned drawbar mount pin openings 8 and corresponding round hitch mount pin openings 25.

It will be appreciated that the draw bolt nut 19 can be welded or otherwise fixed to the lock plate engaging leg 44 and the draw bolt head 15a (FIG. 5) positioned adjacent to the upper leg of the ball mount 30, to operate the pin-engaging lock plate wedge 39 in the manner described above, except by rotation of the draw bolt 15.

While the preferred embodiments of the invention have been described above, it will be recognized and understood that various modifications may be made in the invention and the appended claims are intended to cover all such modifications which may fall within the spirit and scope of the invention.

Having described my invention with the particularity set forth above, what is claimed is:

1. A pin-engaging wedge for selectively immobilizing a drawbar in a receiver having oppositely-disposed receiver pin openings, comprising:
   a pair of oppositely-disposed, elongated drawbar pin openings provided in said drawbar for selectively registering with said oppositely-disposed receiver pin openings in the receiver;
   a pin extending through said oppositely-disposed receiver pin openings and said pair of said oppositely-disposed elongated drawbar openings;
   a top frame opening provided in said drawbar
   an engaging member provided in said drawbar; and
   a lock plate fixed to said engaging member and a guide plate having a guide plate slot for receiving said engaging member and a tab extending through said top frame opening in said drawbar, said lock plate engaging the pin, wherein said lock plate tightens against the pin and said guide plate and the drawbar is forced against the receiver receptacle, responsive to manipulation of said engaging member.

2. The pin-engaging wedge of claim 1 wherein said engaging member comprises a bolt having a shank end fixed to said lock plate, said shank end extending through said guide plate slot and a threaded end of said bolt extending from the drawbar for receiving a nut, and comprising a toe bar provided on said guide plate, wherein tightening of said nut on said threaded end of said bolt tightens said lock plate against said pin and said toe bar and said guide plate and tightens the drawbar against the receiver receptacle.

3. In a drawbar for connecting an accessory to a trailer hitch receiver having a receiver receptacle and round, oppositely-disposed, transverse pin or bolt openings, wherein the drawbar is removably disposed in the receiver receptacle, the improvement comprising:
   elongated openings provided in the drawbar, respectively, for registering with the round, oppositely-disposed, transverse pin or bolt openings in the receiver receptacle;
   a pin or bolt extending through said elongated openings in the drawbar and the registering round, oppositely-disposed transverse pin or bolt openings in the receiver receptacle to prevent the drawbar from exiting the receiver receptacle;
   a top frame opening provided in the drawbar and a lock plate and a guide plate having a tab extending through said top frame opening in the drawbar and a slot, and a toe bar engaging said lock plate, and a bolt having a bolt head or shank fixed to said lock plate and threads extending through the drawbar and a nut threaded on said threads and seated against the drawbar for displacing and tightening the drawbar against the trailer hitch receiver responsive to manipulation of said bolt.

4. A method for selectively tightening a drawbar in a receiver receptacle having round, oppositely-disposed, transverse pin openings, comprising the steps of:
   (a) providing elongated or elliptical openings in the drawbar, respectively, for alignment with the pin openings in the receiver receptacle and receiving a pin or bolt to prevent removal of the drawbar from the receiver receptacle; and
   (b) providing a lock plate fixed to the unthreaded end of a threaded rod extending into the drawbar and a guide plate having a tab extending through the wall of the drawbar and a toe bar provided on the guide plate for engaging the lock plate and a slot provided in the guide plate for receiving the threaded rod, wherein the lock plate is tightened against the toe bar and the guide plate for tightening the drawbar against the receiver receptacle responsive to manipulation of the threaded rod.

* * * * *